(12) United States Patent
Mishra

(10) Patent No.: US 7,806,221 B2
(45) Date of Patent: Oct. 5, 2010

(54) AIRBAG SYSTEM

(75) Inventor: Indu B. Mishra, Columbia, MD (US)

(73) Assignee: Automotive Systems Laboratory, Inc., Armada, MI (US)

(*) Notice: Subject to any disclaimer, the term of this patent is extended or adjusted under 35 U.S.C. 154(b) by 777 days.

(21) Appl. No.: 11/327,754

(22) Filed: Jan. 5, 2006

(65) Prior Publication Data

US 2006/0169517 A1 Aug. 3, 2006

Related U.S. Application Data

(60) Provisional application No. 60/641,566, filed on Jan. 5, 2005.

(51) Int. Cl.
*B60K 28/00* (2006.01)
*B60R 21/01* (2006.01)

(52) U.S. Cl. ............ 180/274; 180/271; 280/730.1; 280/735

(58) Field of Classification Search ......... 280/735, 280/729, 730.1, 736; 180/274, 271; 701/45
See application file for complete search history.

(56) References Cited

U.S. PATENT DOCUMENTS

| | | | | |
|---|---|---|---|---|
| 3,365,572 | A | 1/1968 | Strauss | 246/167 |
| 3,656,791 | A | 4/1972 | Truesdell | 293/1 |
| 3,708,194 | A | 1/1973 | Amit | 293/1 |
| 4,176,858 | A | 12/1979 | Kprnhauser | 280/734 |
| 4,518,183 | A | 5/1985 | Lee | 293/118 |
| 4,930,823 | A | 6/1990 | Rivera | 293/107 |
| 5,106,137 | A | 4/1992 | Curtis | 293/107 |
| 5,431,463 | A | 7/1995 | Chou | 293/110 |
| 5,468,013 | A * | 11/1995 | Gille | 280/729 |
| 5,651,569 | A | 7/1997 | Molnar | 293/107 |
| 5,725,265 | A | 3/1998 | Baber | 293/107 |
| 5,732,785 | A | 3/1998 | Ran et al. | 180/271 |
| 6,056,336 | A | 5/2000 | Balgobin | 293/107 |
| 6,126,214 | A | 10/2000 | Kim | 293/107 |
| 6,129,380 | A * | 10/2000 | Rink et al. | 280/737 |
| 6,139,052 | A * | 10/2000 | Preamprasitchai | 280/735 |
| 6,209,908 | B1 * | 4/2001 | Zumpano | 280/729 |
| 6,209,909 | B1 * | 4/2001 | Breed | 280/735 |
| 6,757,611 | B1 | 6/2004 | Rao et al. | 701/301 |
| 6,883,631 | B2 * | 4/2005 | Hu et al. | 180/274 |
| 6,918,459 | B2 | 7/2005 | Breed | 180/282 |
| 6,920,954 | B2 * | 7/2005 | Hashimoto et al. | 180/274 |
| 7,128,335 | B2 * | 10/2006 | Hasebe et al. | 280/731 |
| 7,211,752 | B2 * | 5/2007 | Okamoto et al. | 200/61.58 R |

(Continued)

FOREIGN PATENT DOCUMENTS

DE 30 13 0 22 10/1981

(Continued)

*Primary Examiner*—Paul N. Dickson
*Assistant Examiner*—George D. Spisich
(74) *Attorney, Agent, or Firm*—L.C. Begin & Associates, PLLC

(57) ABSTRACT

A vehicle protection system 7 contains an airbag system 8 employing a plurality of sets of airbags 118a-118c external to the vehicle 9. Each set 118a-118c contains one or more airbags 118 wherein the plurality of sets 118a-118c are sequentially operated based on initial collision data, and then based on operating parameters such as pressure differentials over time.

16 Claims, 6 Drawing Sheets

U.S. PATENT DOCUMENTS

| | | | |
|---|---|---|---|
| 7,232,001 B2 * | 6/2007 | Hakki et al. | 180/271 |
| 7,287,778 B2 * | 10/2007 | Suekuni | 280/730.2 |
| 7,390,014 B2 * | 6/2008 | Takimoto | 280/730.1 |
| 2001/0015548 A1 | 8/2001 | Breed et al. | 280/735 |
| 2004/0036262 A1 | 2/2004 | Kanuma et al. | 280/739 |
| 2004/0049331 A1 | 3/2004 | Schneider | 701/45 |
| 2004/0083042 A1 | 4/2004 | Strumolo et al. | 701/45 |
| 2004/0107033 A1 | 6/2004 | Rao et al. | 701/45 |
| 2004/0169362 A1 | 9/2004 | Hammer et al. | 280/751 |
| 2004/0239083 A1 | 12/2004 | Mori et al. | 280/730.1 |
| 2005/0035608 A1 | 2/2005 | Larsen et al. | 293/107 |
| 2005/0046206 A1 | 3/2005 | Ohno et al. | 293/120 |
| 2005/0060069 A1 | 3/2005 | Breed et al. | 701/29 |
| 2005/0065688 A1 | 3/2005 | Rao et al. | 701/45 |
| 2005/0077746 A1 | 4/2005 | Rajasingham | 296/26.08 |
| 2008/0054603 A1 * | 3/2008 | Breed et al. | 280/729 |

FOREIGN PATENT DOCUMENTS

| | | |
|---|---|---|
| DE | 44 00 167 | 7/1995 |
| FR | 1367954 | 10/1971 |
| GB | 2 336 5 72 | 10/1999 |

\* cited by examiner

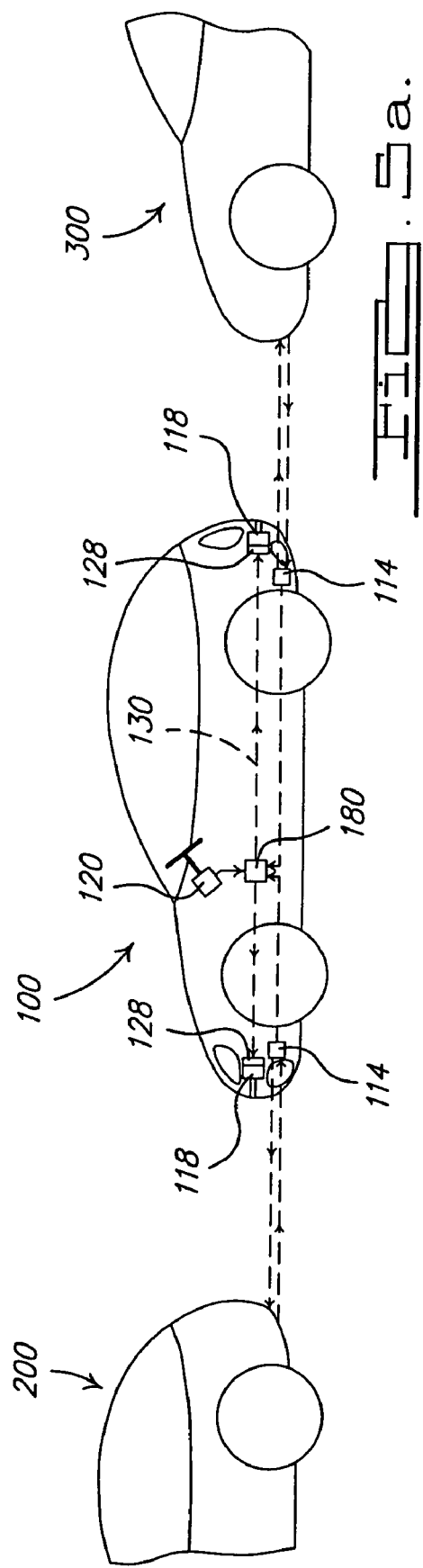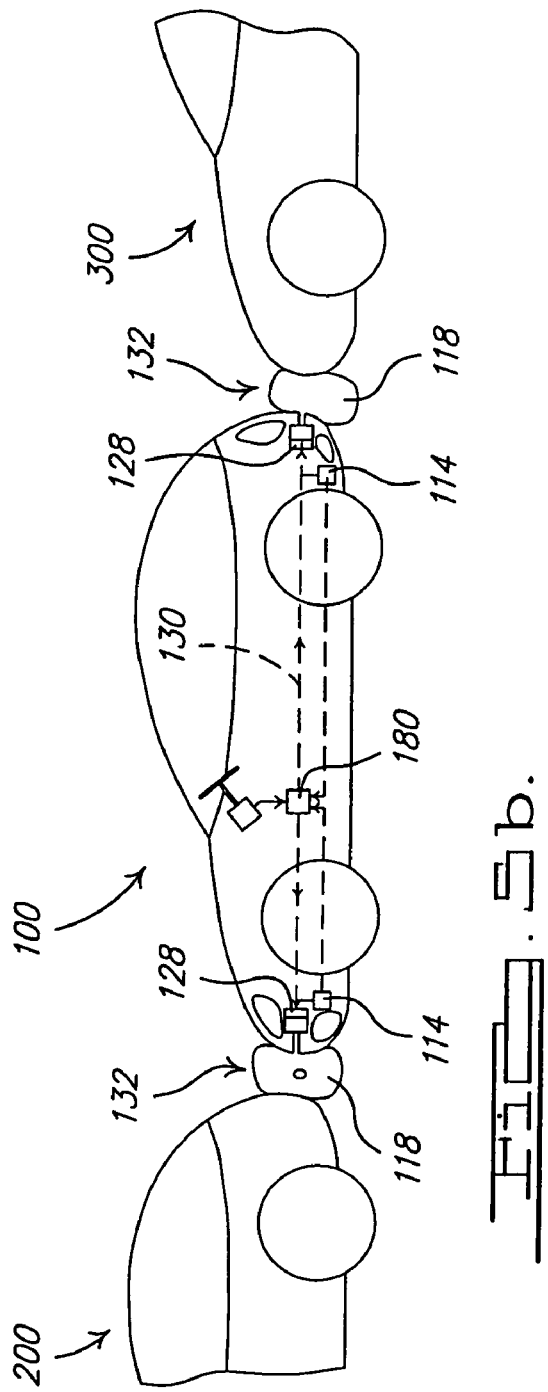

AIRBAG SYSTEM

CROSS REFERENCE TO RELATED APPLICATIONS

The present application claims the benefit of U.S. Provisional Application Ser. No. 60/641,566 having a filing date of Jan. 5, 2005.

FIELD OF THE INVENTION

This invention relates to vehicle exterior airbag systems and more particularly to an airbag system containing airbags that sequentially operate to mitigate damage to the vehicle upon a crash event.

BACKGROUND OF THE INVENTION

Various proposals have been made to reduce the weight of vehicle bumpers while increasing their energy absorbing characteristics thereby mitigating damage during collisions. Concurrent proposals often include the employment of exterior airbag systems to provide additional protection while maintaining an overall relatively lower vehicular weight.

One approach has been to mount compressible energy absorbing plastic material on a rigid bumper beam. In order to provide secondary energy absorption in such systems it has been proposed that a collapsible plate like member be embedded in the compressible energy absorbing plastic material as shown in U.S. Pat. No. 3,856,613. While suitable for their intended purpose, such systems add weight to the vehicle and require special tooling to form the compressible energy absorbing plastic material around the components which form the collapsible plate-like member.

Another approach, shown in U.S. Pat. No. 3,656,791 for example, provides a vehicle bumper with a fascia covering an inflatable air bag. The air bag is located behind the fascia during normal use. On impact the air bag breaks through the fascia destroying it and exposing the air bag to damage as it extends beyond the fascia to be directly exposed to an impacting object. Upon operation there is a potential of rupture of the air bag on impact. Such rupture releases the inflating medium in an uncontrolled manner such that the device no longer provides impact absorption under controlled conditions. Additionally, during normal operation there is no provision for releasing the fluid or gas from the air bag to provide a controlled rate of energy absorption which will avoid damage to the bumper system.

Accordingly, it would be an improvement in the art to develop an airbag system or collision dampener that not only reduces the weight of the vehicle but also reduces the mechanical damage of the vehicle in the event of a collision.

SUMMARY OF THE INVENTION

In accordance with the present invention, an airbag system is provided that addresses the concerns mentioned above. A plurality of airbags are sequentially employed to soften or dampen the force of collision thereby mitigating vehicular damage and also mitigating damage to vehicular occupants. The airbags are operative based on control system configurations that signal sequential operation of the airbags upon receipt of measured parameter differences in a deployed bag(s). The parameter measured incrementally as known in the art may include a pressure differential, a time differential, and/or a temperature differential of the deployed airbag(s) over time.

In operation, a sensor system employing known sensors such as anticipatory or predictive sensors as known in the art, and/or employing impact sensors for example, indicates either the impending collision or the actual collision, thereby beginning sequential deployment of the airbags at any location on the vehicle where desirably employed. Once the first airbag(s) is deployed, a control processing unit (CPU) monitors system conditions such as pressure, time of deployment, or temperature of the airbag for example. Once a predetermined threshold of the operating parameter has been met, such as a minimum measurement for example, the CPU signals deployment of another of the plurality of airbags in a known manner. The venting of each airbag in the plurality of airbags is presumed, either by design or by rupture thereby providing a dampening of the collision forces as the airbags are deployed responsive to this pressure decrease. As described above, the pressure decrease may be determined by actual measurements, or it may be correlated to temperature and/or time differentials during system operation.

BRIEF DESCRIPTION OF THE DRAWINGS

FIG. 5 is a view of an airbag system employed at the front and rear of a vehicle, before and after activation;

DETAILED DESCRIPTION

Figure 1:
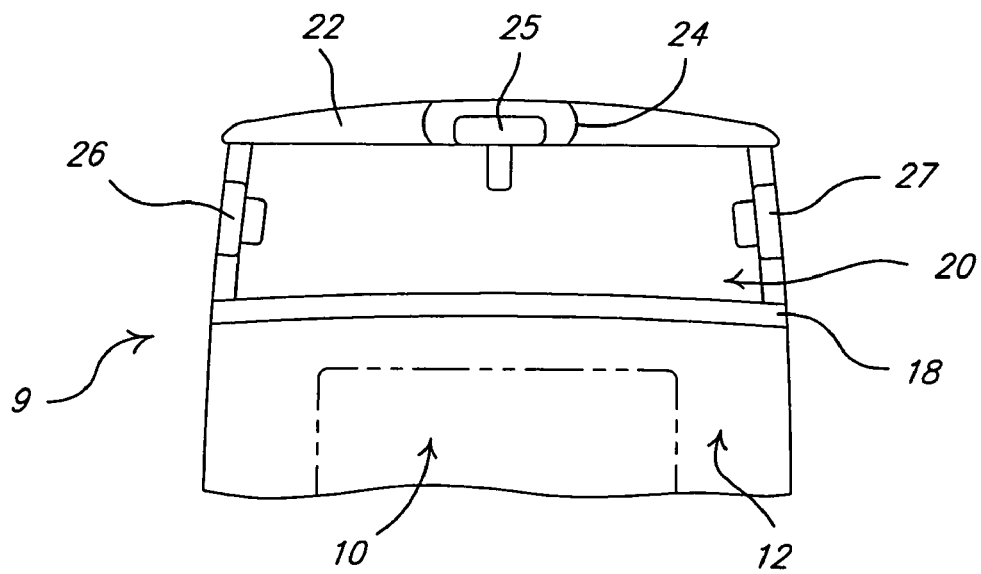
FIG. 1 is a cross-sectional plan view of an airbag system in accordance with the present invention, in an undeployed state.

FIG. 1 shows a cross-sectional plan view of one embodiment of a vehicle protection system 7 including an airbag system 8 in accordance with the present invention. FIG. 1 shows a front portion of a conventional motor vehicle 9 in which an engine 10 is mounted in an engine compartment 12 partially defined by a front transverse mounting structure or bulkhead 18. For purposes of the present invention, bulkhead 18 and everything behind it is conventional and detailed illustration and description thereof is not provided.

A lightweight supporting frame 20 is disposed forwardly of and mounted to bulkhead 18, and a bumper 22 is mounted to and carried by supporting frame 20. A plurality of airbag units 24, 25, 26, and 27 is also mounted to supporting frame 20. Supporting frame 20 may be formed from any suitable lightweight material, such as a polymer or a magnesium or aluminum alloy. Frame 20 may be cast, metal formed, molded, or fabricated. In the embodiment shown in FIG. 1, frame 20 is fabricated from sheet metal components suitably interconnected, for example, by bolts, rivets, or welding. For ease of replacement, it is desirable that supporting frame 20 be detachably fastened to bulkhead 18 using, for example, conventional threaded fasteners. However, it will be appreciated that other methods of detachable or permanent fastening (for example, adhesives or welding) may be used to secure supporting frame 20 to bulkhead 18.

In the embodiment shown in FIG. 1, bumper 22 is formed as a cross-beam which extends across the width of the vehicle. Bumper 22 may be mounted to supporting frame 20 using any convenient method, such conventional threaded fasteners or adhesives. Bumper 22 may be formed from sheet metal, plastic or a resilient rubber material.

It will be appreciated that one or more elements of the present invention might alternatively be mounted on something other than a supporting frame of the type shown in FIG. 1. For example, rather than being mounted to supporting frame 20, airbags 24, 25, 26, and 27 may be mounted directly to bulkhead 18 or to a portion of the vehicle frame using any one of several known attachment methods, such as threaded fasteners, adhesives, or welding.

Referring again to FIG. 1, air bag 24 is formed using known methods from conventional reinforced fabrics which are preferably strong enough to withstand a collision without rupturing. Materials of this type include fiber reinforced plastic, rubberized material, and pliable carbon fiber composites. Airbag 24 is positioned as shown in FIG. 1, in the front portion of the vehicle behind bumper 22. Airbag 24 is designed to deploy in the event of a frontal collision with another vehicle or object, and to absorb the collision impact forces by deflating. Airbag 24 is sized and shaped so that, when deployed, it will cover at least a portion of the front of the vehicle, and, is preferably large enough to protect a substantial portion of the front of the vehicle. It is understood that the deployed air bag can be considerably larger than bumper 22.

During inflation of airbag 24, heat from inflator combustion products is transferred to the fabric material from which airbag 24 is formed. A thermally-conductive metallic layer is preferably formed on an exterior of the bag fabric material by a process such as sputtering, vacuum or vapor deposition, electroless plating, or electrolytic plating. Alternatively, the thermally-conductive layer may be formed by laminating a folded metal or foil layer onto an outer surface of the bag fabric material. Any thermally-conductive metal may be used, such as aluminum, nickel, copper, silver, tin, or combinations or alloys thereof. The metallic layer helps to dissipate heat from the inflator combustion products. Thus, to promote rapid heat dissipation, it is preferable that the metallic layer be as thermally conductive as possible.

Airbag 24 is fitted with a relief valve (not shown) designed to open under a predetermined internal pressure created inside airbag 24 upon impact. The relief valve is also designed to control the internal pressure in airbag 24 at which deflation starts, and to control the rate of airbag deflation. Any suitable known relief valve construction which is normally closed by gravity and/or a spring or the equivalent may be used.

Referring again to FIG. 1, airbag 25 is positioned in an interior of airbag 24. Air bag 25 is formed using known methods from conventional reinforced fabrics which are preferably strong enough to withstand a collision without rupturing. Materials of this type include fiber reinforced plastic, rubberized material, and pliable carbon fiber composites.

As airbag 25 is mounted in the interior of airbag 24, airbag 25 is subject to thermal shock resulting from dissemination of hot inflation gases into airbag 24 during inflation of airbag 24. To provide resistance to thermal shock and to aid in protecting interior airbag 25, a coating of silicon dioxide is applied to an outer surface of airbag 25 using a known method, for example, an electrodeposition process or a vapor deposition process. Silicon dioxide is known for its high resistance to thermal shock. Upon exposure to hot inflation gases, the silicon dioxide coating aids in maintaining the integrity of airbag 25 by delaying thermal damage to airbag 25. Other suitable coating materials, rather than silicon dioxide, may also be used.

Airbags 26 and 27 are formed using known methods from conventional reinforced fabrics which are preferably strong enough to withstand a collision without rupturing. Materials of this type include fiber reinforced plastic, rubberized material, and pliable carbon fiber composites. Airbags 26 and 27 are mounted to opposite corner portions of bumper 22, to influence the rotation and direction of the vehicle upon collision with another vehicle or object.

Airbags 24, 25, 26, and 27 are each deployed using a conventional air bag deployment mechanism, such as an inflator (not shown) coupled to one or more of each of the airbags so as to enable fluid communication with an interior of the associated airbag(s). In the embodiment shown in FIGS. 1-3, a separate inflator is provided for each of airbags 24, 25, 26, and 27. In an alternative embodiment, a separate inflator is provided for each of airbags 26 and 27, while airbags 24 and 25 are deployed using a single inflator (such as a two-stage inflator), designed to initiate phased deployment of airbags 24 and 25. Phased deployment of airbags 24 and 25 using a single inflator may be achieved by any one of several known methods. For example, a separate igniter may be operatively coupled to each combustion chamber of the two-stage inflator, and a timed ignition signal may be provided to each of the igniters. Alternatively, the inflator may be provided with a single igniter, and a known method may be used for achieving timed sympathetic ignition of gas generant in a second combustion chamber of the inflator in response to ignition of gas generant contained in a first combustion chamber. It will be appreciated that many suitable arrangements of inflators and igniters are possible, depending on the requirements of a given application.

Yet another method of sequential operation includes measuring a system parameter such as a pressure differential occurring over time within a deployed airbag. The measured data is received by a central computer processing unit (CPU) and compared to a predetermined threshold programmed for the relative data. As the threshold is reached, the CPU directs subsequent deployment of an airbag within an airbag thereby providing staged or sequenced deployment of the airbag(s) 25 contained within an outer airbag 24. The system parameter such as pressure, time, and/or temperature is measured over time in a known manner, and communicated or transmitted to the CPU. Staged deployment of an airbag or airbags within another outer airbag provides a dampening or softening of the collision force absorbance of the airbags thereby minimizing the associated damage of the adjoining bumpers or vehicular structure. Additionally, the dampening effect softens the force the vehicular occupants are subjected to based on the collision.

In one embodiment, the airbags may be designed to fully deflate in about thirty seconds with ventilation features as described herein. Upon impact, two vehicles come closer at the rate of about 0.5 inch per millisecond at 30 mph. After deployment of an airbag system of the present invention, the closure rate will be reduced by about 20% to about 0.4 inch per millisecond. Deceleration will thereby continue as the airbags are sequentially deployed based on algorithmic control from the CPU. To illustrate operation of an airbag system of the present invention, the first airbag may reflect a 50% deflation by pressure differential measurements whereby the next airbag in the sequence would be deployed to continue a softened or dampened collision. A third airbag internal to the first airbag would inflate when the second series of bags or the second bag is about 70% deflated. In this manner a cascading inflation and successive deflation sequence will ultimately slow the approaching vehicles or objects resulting in a soft impact and minimal damage to the vehicle as well as to the occupants. In general, threshold values indicating 20-80% of the normal value may be selected with regard to monitoring of the respective operating parameter. As such, depending on design considerations, values indicating a pressure loss of a given airbag may for example range from about 20% to 80% of the total initial pressure of the airbag upon activation thereof.

Each inflator contains a combustible gas generant composition for generating inflation gas for inflating one or more associated airbags, and at least one igniter for igniting the gas generant composition in the inflator. Examples of inflators which may be utilized in the present invention are described in U.S. Pat. Nos. 6,752,421, 5,806,888, and 6,341,799, all incorporated herein by reference. Each inflator may also be in operative communication with a crash event sensor (not shown), with each sensor being in communication with a known crash sensor algorithm that signals actuation of one or more associated airbags via, for example, activation of the inflator in the event of a collision. The inflators may be mounted to supporting frame 20, to bulkhead 18, or to the frame of the vehicle using any of a variety of methods, for example crimping, welding, adhesive bonding, or fasteners. Gas generants incorporated into the inflators may comprise one or more non-azide formulations in tablet form. However, many other suitable gas generant compositions are known in the art. Representative examples of suitable compositions are set forth in U.S. Pat. Nos. 5,035,759, 5,872,329, 6,074,502, and 6,210,505, incorporated herein by reference. It should be appreciated that hybrid, and pressurized gas inflators may also be employed in a known manner, and in accordance with the present invention.

Operation of the airbag system will now be discussed with reference to FIGS. 2-3.

Figure 2:
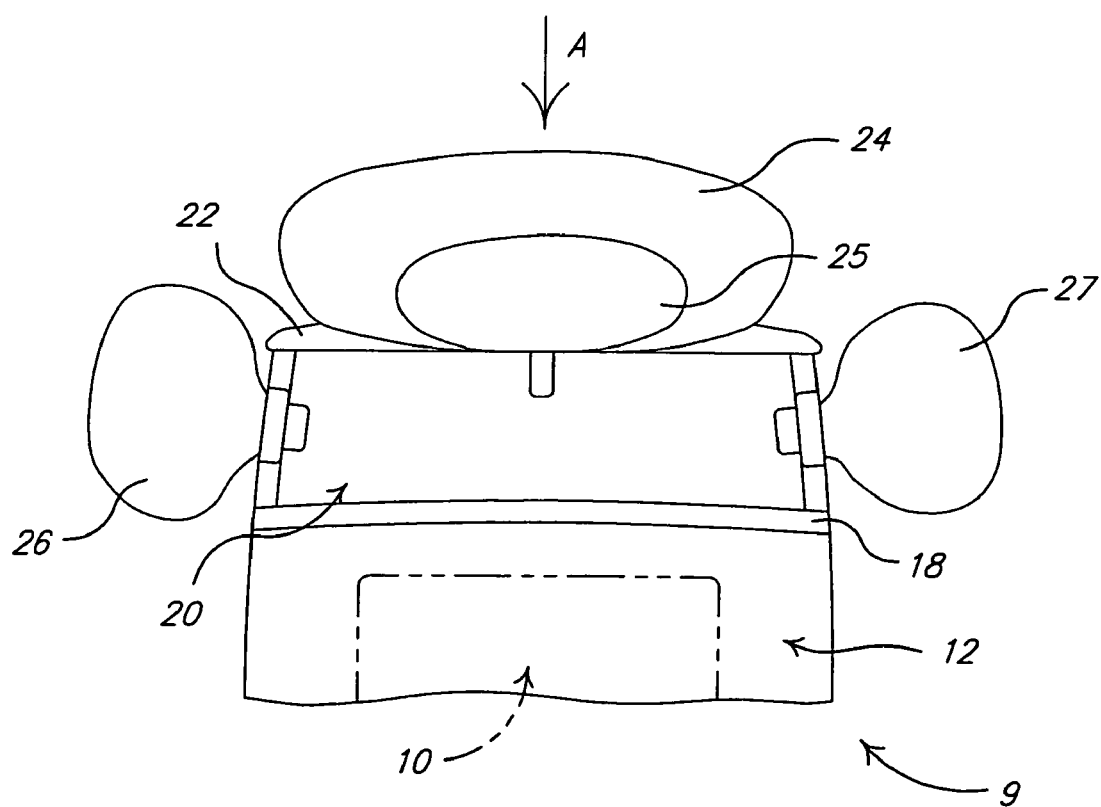
FIG. 2 is the view of FIG. 1 showing initial deployment of the airbag system.
Figure 3:
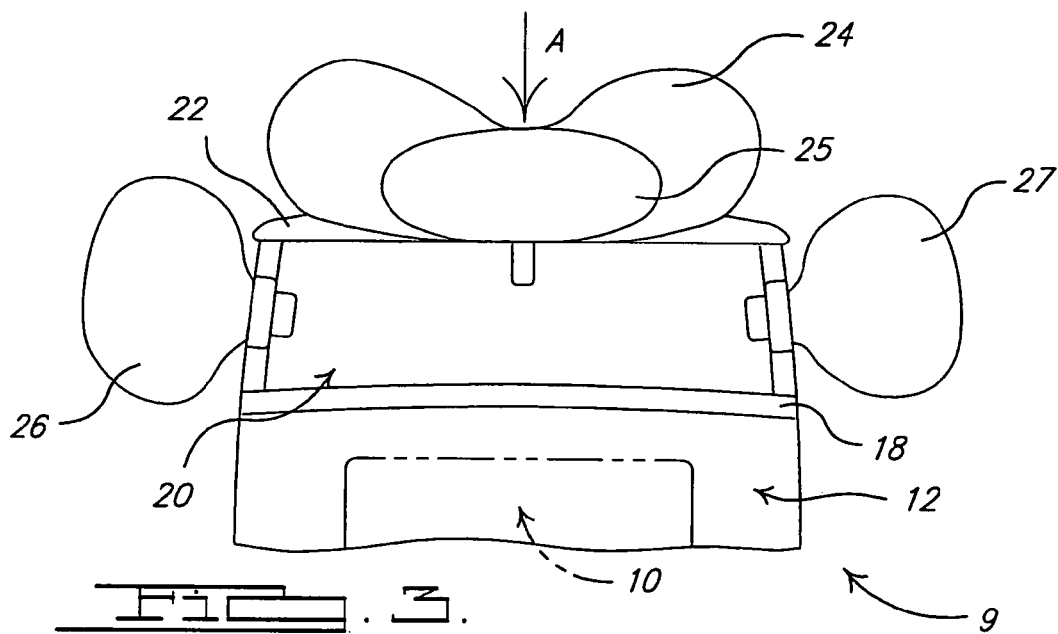
FIG. 3 is view of FIG. 2 showing a later stage of airbag deployment.

Referring to FIG. 2, upon a crash event, a signal from a crash sensor (not shown) is conveyed to inflator(s) coupled to airbags 24, 26, and 27, thereby activating the associated igniter(s) and igniting gas generants incorporated into the inflator(s). Inflation gas then exits the inflator(s) and flows into airbags 24, 26, and 27, thereby inflating the airbags. Approximately one second after activation of airbags 24, 26, and 27, airbag 25 is similarly activated, either by a timed response to the signal which activated the other airbags, or by a separate signal transmitted to an inflator associated with airbag 25, such as a signal transmitted from a CPU responsive to a threshold voltage resulting from a pressure differential in airbag 24.

The inflated volume of air bag 24 is held for only a short time after impact. Then, deformation of bumper 22 directs the impact force (in the direction indicated by arrow "A") against the expanded surface of airbag 24 to push inwardly against the air bag (FIG. 2). As airbag 24 is pushed inward, pressure increase in air bag 24 will act on the relief valve to open it so that the inflation gases are exhausted through the relief valve in the airbag. The controlled exhaust of airbag 24 provides collision energy absorption. The pressure at which the relief valve will be activated can be selected such that there is a delay period in milliseconds, following inflation, before the internal airbag is pressure relieved. As airbag 24 is pushed further inward, airbag 24 contacts inflated airbag 25 (FIG. 3). Further pressure on airbag 25 by airbag 24 causes airbag 25 to deflect inward, providing a further degree of collision energy absorption. The energy absorbed during the deflation of airbag 24 and the resistance to deformation provided by airbag 25 combine to reduce vehicle damage during impact. Contact between airbags 26, 27 and the other vehicle or object aids in preventing spinning or dislocation of vehicle 9 relative to the other vehicle or object.

The relatively large degree of energy absorption provided by the structure described above enhances protection to the body of the vehicle and increases vehicle occupant safety. In addition, the destructible front end portion of the vehicle can be replaced easily and expeditiously and without necessity of removing adjacent portions of the vehicle body. It will be appreciated that the supporting frame and airbag system described above can alternatively (or additionally) secured to a rear portion of the vehicle, as well as to the front of the vehicle, thereby offering increased protection from damage resulting from rear end collisions, as well as front end collisions.

Sensors

Although a typical application for anticipatory sensors is in side impacts, frontal or rear impact anticipatory sensors may also be used to identify the impacting object before the crash occurs. Prior to going to a full frontal impact anticipatory sensor system, neural networks can be used to detect many frontal impacts using data in addition to the output of the normal crash sensing accelerometer. Simple radar or acoustic imaging, for example, can be added to current accelerometer based systems to give substantially more information about the crash and the impacting object than possible from the acceleration signal alone.

Front, rear, and side impact anticipatory sensors employed in accordance with the present invention can use any of a variety of technologies including optical, radar (including noise radar, micropower impulse radar, and ultra wideband radar), acoustical, infrared, or a combination thereof. The sensor system typically contains a neural network processor to make the discrimination, however, a simulated neural network, a fuzzy logic or other algorithm operating on a microprocessor can also be used.

Exemplary anticipatory sensors are known in the art and may be incorporated into the vehicle protection system of the present invention. As such, with respect to art related to the subject matter of this application, reference is made to European Patent Publication No. 0 210 079 (Davis). Davis describes, inter alia, a radar system that exemplifies those useful in the present invention, for use in connection with an airbag deployment apparatus to prevent injury to passengers when impact with an approaching object is imminent. Voltage level inputs representative of the distance between an object and the vehicle, the approach rate of the object with respect to the vehicle, the vehicle speed and driving monitor inputs, e.g., steering angles, turning rates and acceleration/deceleration, are all generated by appropriate detectors, weighted according to their importance to a normal vehicle operator's sensed safe or danger levels and then the weighted input voltages are summed to provide an "instantaneous voltage level". This instantaneous voltage level is compared with a predetermined voltage level and if the instantaneous voltage level falls within a predetermined safe zone, output signals are not produced. On the other hand, if the instantaneous voltage level falls outside of the safe zone, i.e., within a danger zone, then the control system can be designed to initiate deployment of the airbag system on the additional condition that the vehicle speed is above a predetermined level. For example, the system can be programmed to deploy the airbag when the vehicle speed is between 35 and 204 miles per hour at a time of about 0.2 second prior to impact thereby enabling the airbag sufficient time to fully inflate.

As far as structure, Davis includes a radar system that includes an antenna assembly, a signal-processing unit and an output monitor. Davis relies on a radar signal generated by an antenna in the antenna assembly and which causes a return signal to be produced upon reflection of the radar signal against the approaching object. The return signal is received by a transceiver to be processed further in order to determine the distance between the object and the vehicle and the rate the object is approaching the vehicle. The return signal from the radar signal generated by the antenna is a single pulse, i.e., a single pixel. The elapsed time between the emission of the radar signal by the antenna and the receipt of the return signal by the transceiver determines the distance between the object and the vehicle and based on the elapsed time for a series of radar signals generated at set intervals, it is possible to determine the approach rate of the object relative to the vehicle.

In operation, the approach rate of the object relative to the vehicle, the distance between the object and the vehicle, the vehicle speed, as well as other driving parameters, are converted to voltage levels. Davis then employs an algorithm to weigh the voltage levels and compare the voltage levels to predetermined conditions for which airbag deployment is desired. If the conditions are satisfied by the results of the algorithm operating on the weighted voltage levels, then the airbag is deployed. In one embodiment, by appropriate manipulation of the voltage levels, false-triggering of the airbag can be prevented for impacts with objects smaller than a motorcycle, i.e., the voltage corresponding to a motorcycle at a certain distance from the vehicle is smaller than the voltage corresponding to a truck, for example at that same distance.

U.S. Pat. No. 6,366,236, herein incorporated by reference, exemplifies a neural network system that includes a system and method of processing a radar signal using a neural network that processes the intermediate frequency in-phase and quadrature phase signals sampled in time from a FMCW radar to detect the range of targets illuminated by the associated radar transmit signal, wherein the result of processing by the neural network is similar to the result from the conventional FMCW signal processing steps of DC bias removal, leakage removal, Fast Fourier Transformation, and CFAR detection. The associated neural network radar processor can be implemented on a neural network processor chip for reduced cost and improved reliability. The instant invention also provides a method of training the neural network with signals that are germane to an FMCW radar, including a wide range of target scenarios as well as leakage signals, DC bias signals, and background clutter signals.

In accordance with a first aspect, a neural network radar processor comprises a multilayer perceptron neural network comprising an input layer, a second layer, and at least a third layer, wherein each layer has a plurality of nodes. Each node of the input layer is operatively connected to every node of the second layer. The second and third layers comprise a plurality of subsets of nodes, wherein nodes from one subset of the third layer are operatively connected only to nodes of one subset of the second layer, there being a one-to-one correspondence between subsets in the second and third layers. The respective interconnected subsets constitute respective mutually exclusive subnetworks. The outputs of the nodes in the third layer are operatively connected to outputs of the neural network, and the neural network is trained so that each output node is responsive to a target at in particular range cell and each subnetwork is responsive to targets within a set of target ranges, wherein different subnetworks are responsive to respectively different non-overlapping sets of target ranges.

In accordance with a second aspect, a method of processing a radar signal comprises forming a time series by time sampling in-phase and quadrature-phase components of a down-converted radar return signal, forming a first plurality of first weighted sums, and forming a second plurality of second weighted sums. Each component of the down-converted radar return signal comprises an associated waveform and the time series comprises a plurality of elements. Each first weighted sum comprises a sum of first values weighted by a corresponding set of first weights, and each first value is a first function of a different element of the time series. Each second weighted sum comprises a sum of second values weighted by a corresponding set of second weights. The first plurality of first weighted sums comprises a third plurality of mutually exclusive subsets of the first weighted sums and the second plurality of second weighted sums comprises a fourth plurality of mutually exclusive subsets of the second weighted sums. Each second value of a second weighted sum of one of the fourth plurality of mutually exclusive subsets is a second function of a different first weighted sum of only one of the third plurality of mutually exclusive subsets of first weighted sums. The method further comprises adjusting the first and second sets of weights so that the third set of weighted sums of one of the fourth plurality of mutually exclusive subsets is substantially responsive only to targets in a first set of target ranges, and the third set of weighted sums of another of the fourth plurality of mutually exclusive subsets is substantially responsive only to targets in a second set of target ranges, whereby the first and second sets of target ranges are not overlapping.

In accordance with a third aspect, a method of training a neural network in a neural network radar processor comprises forming at least one first time series of in-phase and quadrature-phase components representing a down-converted radar return signal from a target space and applying the at least one first time series to an input layer of a neural network. Each component comprises an associated waveform and the at least one first time series comprises a plurality of elements. The input layer comprises a first plurality of first nodes. One of the elements of the at least one first time series is applied to each of the first plurality of first nodes, and different elements are applied to different first nodes. The neural network further comprises a second plurality of nodes, a third plurality of corresponding weight values operative at the second plurality of nodes, and a fourth plurality of output nodes. The method further comprises adjusting the third plurality of corresponding weight values so that an output signal at each of the fourth plurality of output nodes is representative of the target space. The at least one first time series is selected from a time series representative of a target space, a time series with a leakage signal and a time series with a DC bias; the target space is selected from a target space with a variation of target reflection size, a target space with target fluctuation, a target space with a variation of target position relative to the radar, a target space with a variation in target speed relative to the radar, a target space with a variation in a target viewing angle, a target space with a variation in target shape, a target space with a variation in target size, a target space with a variation in antenna beam pointing angle, a target space with background clutter, and a target space with glint. For the at least one first time series selected from a time series with a leakage signal but no target, a time series with a DC bias but no target, and a time series representing a target space with background clutter, the third plurality of corresponding weight values are adjusted so that the output signal at each of the fourth plurality of output nodes tend towards a nullity.

U.S. Pat. No. 6,085,151, herein incorporated by reference, describes yet another exemplary system that can sense objects that may collide with the host vehicle prior to the actual impact. The instant invention estimates the time to impact of the colliding object, identifies the type and estimates the severity of the crash for controlling one or more of the following vehicular devices so as to enhance the safety of the occupant of the vehicle: a) warning devices to alert the driver of impending danger from a potential crash, b) the vehicle braking and/or steering system for automatically avoiding a potential crash if possible, and c) occupant restraint devices such as energy absorbing seat belt tensioners and variable rate air bag inflators. Accordingly, a predictive collision sensing and deployment control system with the following features may be provided in context of the present invention:

1. Scans through a large angular region (e.g., >±100 degrees) about a host vehicle velocity vector.
2. Tracks multiple (e.g., >25) objects simultaneously to ensure all potentially threatening objects are accounted for.
3. Projects the tracks forward in time to derive probability of impact, time to impact, severity of impact, and point/angle of impact for deploying the active safety system.
4. Treats every sensor report as a possible colliding object and performs threat assessment analysis thereon to determine if a given sensor report was a false alarm, thereby greatly reducing the likelihood of missing a collision.
5. Requires no data regarding the host vehicle speed, heading, location, etc. and also needs no data on the state of the roadway, (e.g., curving, straight), and no knowledge of the location of the host vehicle within the roadway to further prevent missing possible colliding objects, thereby increasing the reliability of the system during skids or slides when the vehicle is out of control.
6. Is immune to interference from other similar systems in the area due to unique signal encoding.
7. Is used to deploy and control the method and mix of deployment of vehicle control and occupant restraint systems such as a combination of seat belt pre-tensioners, airbags, brakes, as well as external damage mitigation systems such as external airbags. Is also used to warn the operator of impending crash for operator based avoidance (i.e. steering or additional braking).
8. Adaptively scans or points the antenna to increase the rate of updates from information rich locations in the event of a possible high threat target to improve the estimate of the collision time and severity.
9. Detects if the host vehicle will collide with another either moving or stationary object or if another vehicle will collide with the host vehicle, even if the host vehicle is stationary, over a wide range of approach angles.

A range-Doppler image is used not only to generate the speed of all targets instantaneously, but also to provide sub-antenna beam resolvability of multiple targets in the radar beam. This allows the system of the instant invention to use a broader beam and cover an entire search volume around the car more quickly. It also reduces the complexity of the radar system in terms of the number of beams that would be used in a multiple beam array (MBA), or the size of a phased array antenna.

The sensor system also incorporates adaptive range-Doppler imaging for improved performance against volumetric clutter. For example if a collection of small objects such as soda pop cans were thrown from an overpass, most known radar systems would be fooled into predicting an impending collision. In contrast, the instant invention uses a combination of improved range resolution and range-Doppler imaging to resolve the clutter as a non-threat.

One of ordinary skill will appreciate that although predictive sensors are described herein, other sensors known or useful in the art may also be implemented alone or in conjunction with the anticipatory or predictive sensing technology discussed above. For example, impact sensor as exemplified in U.S. Pat. No. 5,725,265, herein incorporated by reference, may be employed with the sequentially operative airbags of the present invention.

Central Computer Processing Unit

In an exemplary airbag system of the present invention, a central computer processing unit (CPU) described in U.S. Pat. No. 5,646,613 (incorporated herein by reference) may be used. Other known technologies that accomplish the equivalent result are also contemplated with regard to the CPU. The exemplary CPU is equipped with a computer based system for predicting a collision and deploying air bags at an appropriate time for reducing the amount of damage sustained by the vehicle in the accident. The airbag system basically includes, a radiant energy detector, a speed detector, an energy absorbing inflation unit and a central computer processing unit (CPU).

The radiant energy detector can be of any known type, such as, ultrasonic, infrared, radar (laser, microwave, etc.), and acoustic detection devices. Exemplary sensors are described herein, the discussion of which is pertinent here. In the preferred embodiment, laser radar is used because of the more narrow beam width and angular resolution. More importantly, laser radar gives more specific and precise information of detected vehicles or obstacles direction, distance, size and relative speed. One such system may include a radar detection device transmitting and receiving signals at a rate in the range of 1 to 1,000,000,000 samples per second. The data obtained by laser radars (hereinafter, radars) is processed by a computer to determine the time of an imminent collision.

The speed detector of the preferred embodiment provides speed information to the CPU concerning the speed, direction, and other vital information concerning the roadway vehicle. This information gives the CPU the instantaneous parameters of the operation of the vehicle allowing the CPU to predict the time an impact will occur.

The energy absorbing inflation unit, typically an air bag unit, responds to a control signal generated by the CPU. The unit has a volume of inflation gas contained in an inflator. The inflator has an electronically controlled valve that is activated by the CPU, releasing the inflation gas into a puncture resistant air bag. The air bag forms an energy absorbing and diverting buffer between the vehicle equipped as such and the object of collision. As explained herein, the air bags may employ high pressure release valves to divert and dissipate the absorbed energy into the atmosphere.

A CPU capable of receiving, and processing input information, and ultimately generating an output signal initiating action is used. Such CPUs are conventional in the art. The CPU, through simple known algorithms, given the necessary speed, distance, and directional data, can predict when an accident or collision is imminent. The CPU, once the prediction has been made, further assesses the time necessary to maximize the protective effect of inflation and generates a control signal to the inflation unit. The time deemed necessary is generally referred to as a minimum allowable time window. As an imminent collision leaves the reactionary control of the driver, the time window is established so that the air bag can inflate to proper size and pressure before impact. The air bags, which are known in the art, are capable of inflation on the order of tenths of a second. Thus, once a collision becomes imminent, unavoidable and inescapable, the CPU will determine the time of impact, set the minimum allowable time window, optionally alert the vehicle operator and send a control signal to the air inflation unit. The control signal will cause the air bag to inflate during the minimum allowable time window, and the inflated air bag will absorb the energies associated with colliding bodies. These energies generally include kinetic, momentum and inertial energies, among others.

Figure 4A:
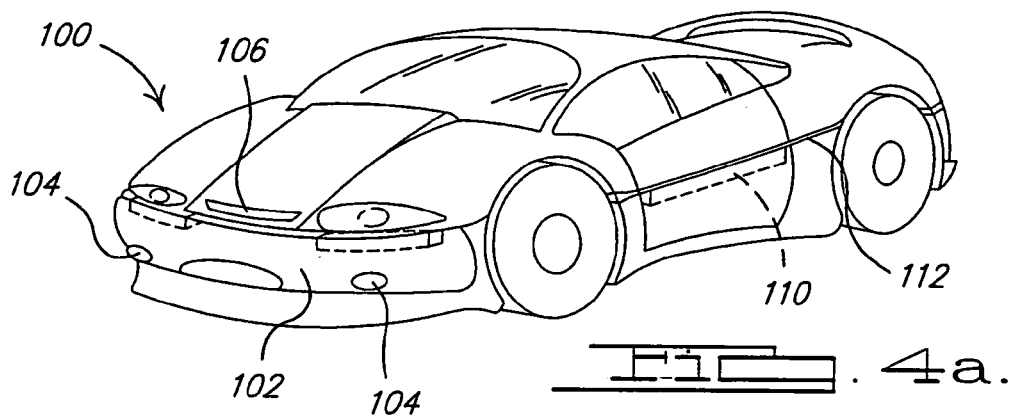
FIG. 4 is a view of an airbag system along a side and front of a vehicle, before and after activation.
Figure 4B:
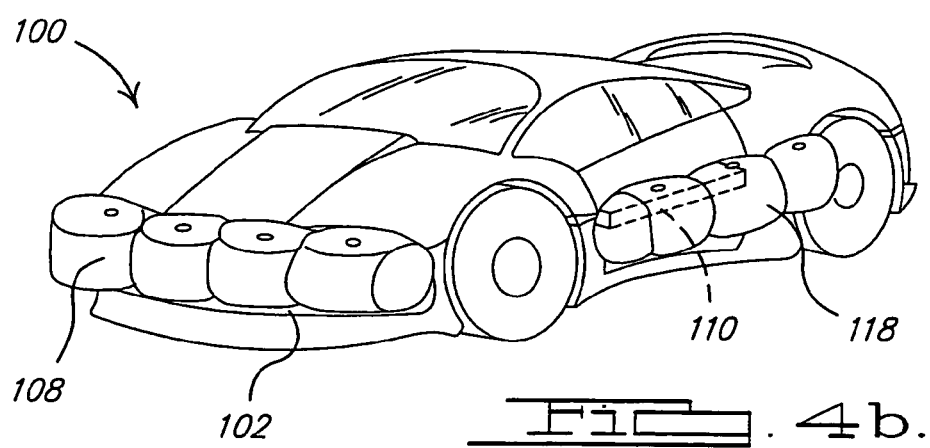
Figure 6:
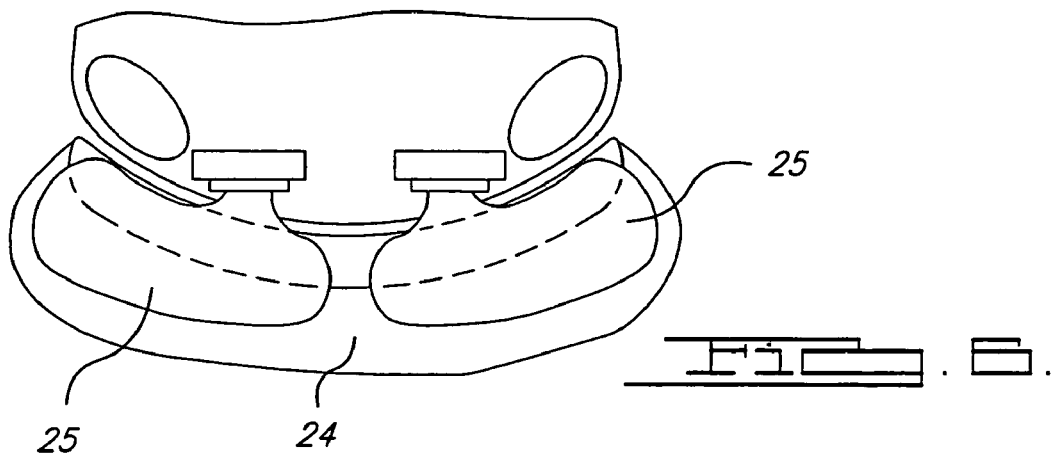
FIG. 6 exemplifies a multiple airbag system along a front bumper of a vehicle, the system containing a plurality of airbags within another.
Figure 9:
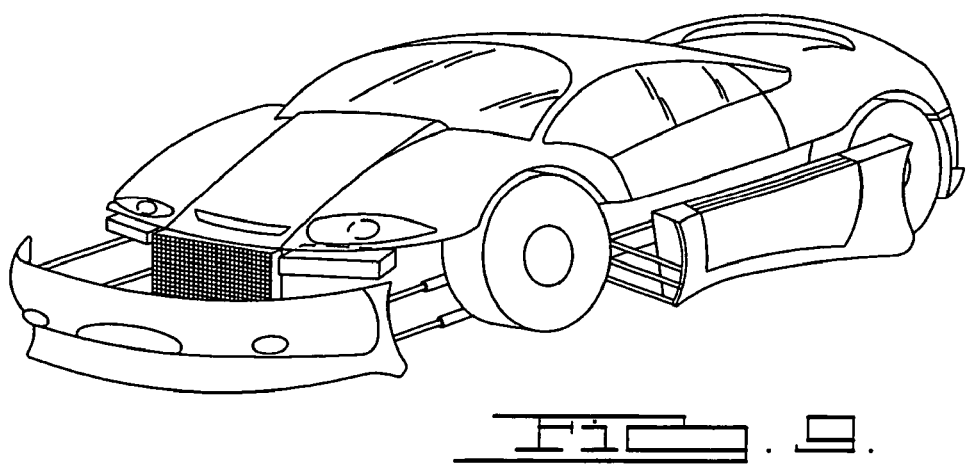
FIG. 9 is an exploded view of a vehicle exhibiting features of the present invention.

Referring to FIGS. 4 and 5, a roadway vehicle 100 is equipped with the system of the present invention described herein. The system does not interfere with the current level of aesthetic qualities associated with the modern vehicle of today. The exterior of the vehicle 100 has bumpers 102 supporting radar ports 104 and air bag ports 106. When activated, air bag 108 is inflated through the air bag port 106, forming the impact buffer between the vehicle 10 and the object of the collision. As shown in FIG. 9, mounted in the door panels 110 of vehicle 100 may be air bag ports 112 and additional radars 114 and radar ports 116. Upon decision of CPU 180, air bags 118 are deployed through ports 112, preventing damage to the side of vehicle 100 in a manner similar to that previously described.

In FIG. 5, the vehicle 100 is in typical traffic road flow. Vehicle 100 is preceded by lead vehicle 200, and succeeded by trailing vehicle 300. The convoy depicted is commonly seen on any roadway, and the speed of each vehicle should be at the appropriate speed limit. Unfortunately, conditions arise that cause disruption in the uniform flow of traffic. For example, while traveling on a high speed roadway, lead vehicle 200 approaches an unexpected road hazard, such as a major pothole. Lead vehicle 200 attempts to slow down or stop. Unfortunately, the vehicles 100 and 300 fail to anticipate the danger ahead of lead vehicle 200.

As lead vehicle 200 suddenly changes speed by braking, radars 114 aboard vehicle 100 detect these changes and submit the information to CPU 180. Likewise, as vehicle 100 begins to brake in response to the braking of vehicle 200, radars 114 detect a relative increase in speed from trailing vehicle 300. CPU 180 alerts the operator of vehicle 100 that a collision involving either or both lead vehicle 200 and trailing vehicle 300. CPU 180 also calculates the time that such collision would occur based upon the instantaneous measurements from dashboard 120 and radars 114. From the time calculation, CPU 180 sets a minimum allowable time window, and generates a control signal based upon the minimum allowable time window. When the collision becomes imminent, unavoidable and inescapable, the control signal is sent from CPU 180 to inflation unit 128 via control lines 130. An electronically controlled valve of inflation unit 128 responds to the control signal from CPU 180, and releases a volume of inflation gas contained in inflation unit 128. The inflation gas fills air bags 118 within tenths of a second, after which the inevitable collision occurs.

The air bags 118 provide an energy absorbing buffer between the colliding vehicles 200, 100, and 300. As illustrated in the figures, to help absorb the collision energies, air bags 118 convert the absorbed energies into air and gas movement, the air and gas being released through high pressure release ports 132 in the walls of the air bags 118. The high pressure ports divert the energy by releasing the gas from the air bags 118 into the atmosphere. This allows the air bags to absorb the energy, without forcing the gas back into the inflation unit, which otherwise may cause damage to the electronically controlled valve or the vehicle 10.

Figure 8:
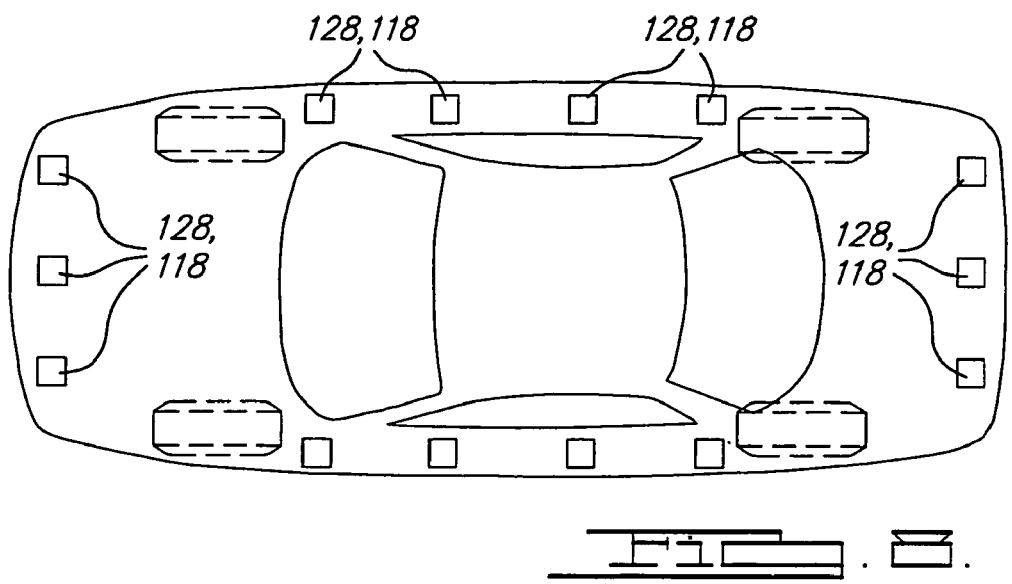
FIG. 8 exemplifies a multiple airbag system formed in accordance with the present invention, containing inflators and airbags about the periphery of the vehicle.

FIG. 8 schematically illustrates the preferred positional arrangement for the inflation units 128 and air bags 118. Vehicle 100 has a plurality of inflation units 128 and associated air bags 118 positioned around the vehicle. An inflation unit assembly, including inflation unit 128 and air bag 118, is representatively illustrated in detail in FIG. 8. Inflation unit 128 contains a volume of compressed gas or a pyrotechnic gas generator, which contents are controlled by a conventionally known electronically controlled valve represented by 128A. The air bag 118 is shown in a deflated and folded disposition adjacent to the inflation unit 128.

Air bags 118 of the present invention are equipped in a known manner, with high pressure release ports that release the gas to the atmosphere. The construction of the high pressure release ports may be accomplished using any of numerous conventional means known in the art. For example, the ports 132 may be formed as areas of the air bag 118 that are several mils thinner than the remainder of the air bag 118. Likewise, the ports 132 may include a pneumatic type valve, such that upon impact a valve stem extends from each port through which the internal pressure at impact is forced. It is also conceived that simple stopper type pop out in each port may be provided. However, the stopper should be permanently tethered to the air bag 118 as a projectile safeguard.

Figure 7:
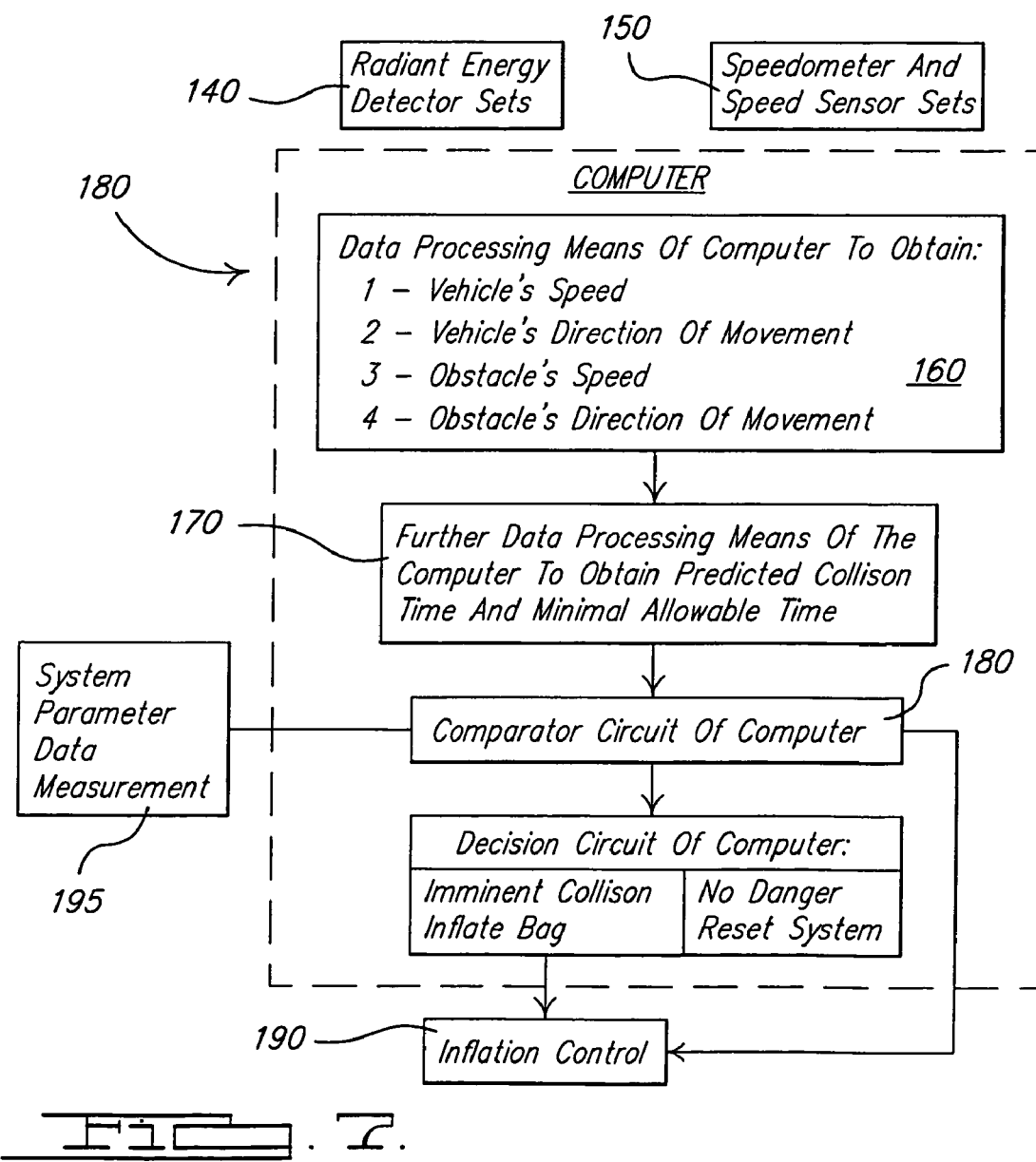
FIG. 7 exemplifies operation of an airbag system in accordance with the present invention.

The block diagram shown in FIG. 7 provides a complete overview of the functional operation of the system disclosed herein. Block 140, radiant energy detector sets, represents the radars 114. Block 150, speedometer and speed sensor sets, represents the dashboard 136 information collected concerning the traveling parameters of the vehicle 100. CPU 180 is shown incorporating the various processing sequences. Block 160 establishes the data gathering and information preparation of the CPU 180. Block 160 receives the information provided by block 140 and 150 and processes the information into useable data for the CPU 180. From block 160, block 170 uses the gathered and processed data and predicts the time of imminent collision, as well as establishes the minimum allowable time window for instructing the inflation units 128 to deploy the air bags 118. Block 180 represents the means to continuously compare the time period calculated for the imminent collision with the minimum allowable time window; this comparison allows the prediction of imminent collision to be readjusted based upon changes in the traveling parameters, i.e., speed, distance direction, etc., so that if the collision is avoided altogether the air bags will not inflate. The output of block 180 is sent to block 185, a decision block. Block 185 of CPU 180 examines the output of block 180 and, when the minimum allowable time window has been reached, renders a decision whether to deploy the appropriate air bags 118 (sub-block 185A) or, alternatively, to reset the system when the collision has been avoided (sub-block 185B). If the collision becomes inescapable and would result in costly damage or injury, the sub-block 185A issues the control signal on line 130 (FIG. 5). Block 190 receives the signal from CPU 180 instructing the inflation unit 128 to release the controlled valve 128A, and inflate the air bag 118, or to otherwise operate an inflator or gas generator, or a bank thereof, in a known manner.

Figure 10:
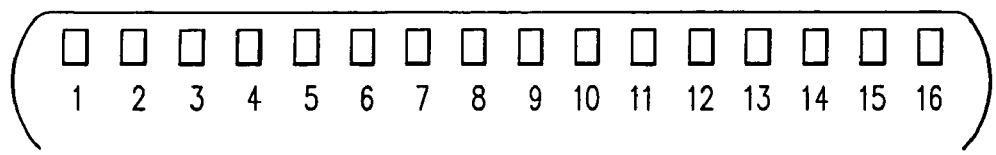
FIG. 10 illustrates a pre-deployment state of a plurality of sets of airbags.
Figure 11:
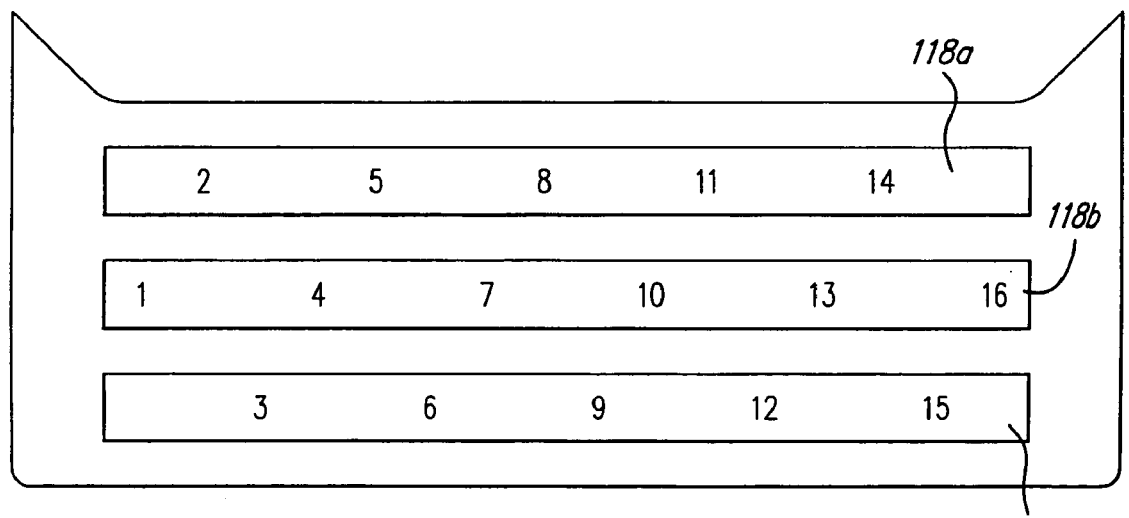
FIG. 11 illustrates a front view of the plurality of sets of airbags of FIG. 10.

As shown in FIGS. 10 and 11, the airbag system of the present invention may contain several distinct pluralities or sets of airbags 118a, 118b, and 118c. Stated another way, the airbag system may contain a first plurality of airbags, a second plurality of airbags, and a third plurality of airbags, wherein each plurality is separably operable responsive to a sensor(s) indicating impending or actual collision. The first plurality 118a is operable based on receipt of a signal indicating impending or actual collision, in a known manner. The second plurality 118b is operable based on receipt of a signal indicating satisfaction of a predetermined threshold value for an operating parameter of the first plurality of airbags 118a, such as a pressure differential over time. The third plurality 118c is operable based on receipt of a signal indicating satisfaction of a predetermined threshold value for an operating parameter of either the first and/or second pluralities of airbags 118a, 118b, such as a pressure differential over time.

In yet another aspect of the invention, a method of mitigating the damage to a vehicle in the event of a collision, and a vehicle protection system employing the method is provided. The method includes but is not limited to the following steps:

1. providing at least one first airbag along the exterior of the vehicle, the at least one first airbag deployable at a first time; and
2. providing at least one second airbag along the exterior of the vehicle, the at least one second airbag deployable at a second time after the first time, the airbags deployable upon indication of an impending or actual collision, and the at least one second airbag deployable upon measurement of an operating parameter of the at least one first airbag.

It is to be understood that the present invention is not limited to the embodiments described above, but encompasses any and all embodiments within the scope of the following claims.

What is claimed is:

1. A vehicle protection system comprising:
   an exterior airbag system for the outside of a vehicle and housed about the exterior of said vehicle, said airbag system comprising at least one first airbag, and at least one second airbag,
   an inflator system for inflation of said at least one first airbag and said at least one second airbag, said inflation system comprising at least one inflator operably communicating with said at least one first airbag and said at least one second airbag; and
   a sensor system for sensing impending or actual collision data, said sensor system comprising at least one sensor and at least one central computer processing unit for receipt and processing of said data, and then selective activation of said inflator system,
   wherein upon activation of said inflator system, said at least one first airbag is inflated, and then said at least one second airbag is sequentially deployed after said at least one first airbag based on measurement of system operating conditions and processing of the same by said central computer processing unit,
   and wherein the system operating conditions include differences in a plurality of operating conditions in said at least one first airbag.

2. The vehicle protection system of claim 1 wherein said system operating conditions include a pressure differential measurable within said first airbag.

3. The vehicle protection system of claim 1 wherein said system operating conditions include a time differential measurable from deployment of said first airbag.

4. The vehicle protection system of claim 1 wherein said system operating conditions include a temperature differential measurable within said first airbag.

5. The vehicle protection system of claim 1 wherein said at least one second airbag is contained within said at least one first airbag.

6. The vehicle protection system of claim 5 wherein at least one third airbag is contained within said at least one first airbag whereby said third airbag is sequentially inflated with respect to said first airbag, and said at least one second airbag.

7. The vehicle protection system of claim 1 wherein said at least one first airbag comprises a first plurality of airbags deployable at substantially the same time, and said at least second airbag comprises a second plurality of airbags deployable at substantially the same time, wherein the first plurality of airbags is deployable prior to deployment of the second plurality of airbags.

8. The vehicle protection system of claim 7 further comprising a third plurality of airbags deployable at substantially the same time, wherein the third plurality of airbags is deployable after deployment of the first plurality of airbags.

9. A method of mitigating the damage to a vehicle in the event of a collision, the method comprising:
   providing at least one first airbag along the exterior of the vehicle, the at least one first airbag deployable at a first time; and
   providing at least one second airbag along the exterior of the vehicle, the at least one second airbag deployable at a second time after the first time, the airbags deployable upon indication of an impending or actual collision, and the at least one second airbag deployable based upon measurement of a temperature within said at least one first airbag.

10. The method of claim 9 further comprising the step of:
    providing at least one third airbag along the exterior of the vehicle, the at least one third airbag deployable at a third time after the deployment of the at least one second airbag, the airbags deployable upon indication of an impending or actual collision, and the at least one third airbag deployable upon measurement of at least one operating parameter of the at least one second airbag.

11. A vehicle protection system employing the method of claim 9.

12. The method of claim 9 wherein the at least one second airbag is deployable based upon measurement of both a pressure in the at least one first airbag and the temperature within said at least one first airbag.

13. The method of claim 9 wherein the at least one second airbag is deployable based upon a measure of temperature over time of the at least one first airbag.

14. The method of claim 9 wherein the at least one second airbag is deployable based upon measurement of both a time after deployment of the at least one first airbag and the temperature within said at least one first airbag.

15. A vehicle protection system comprising:
    an exterior airbag system for the outside of a vehicle and housed about the exterior of said vehicle, said airbag system comprising at least one first airbag, and at least one second airbag;
    an inflator system for inflation of said at least one first airbag and said at least one second airbag, said inflation system comprising at least one inflator operably communicating with said at least one first airbag and said at least one second airbag; and
    a sensor system for sensing impending or actual collision data, said sensor system comprising at least one sensor and at least one central computer processing unit for receipt and processing of said data, and then selective activation of said inflator system,
    wherein upon activation of said inflator system., said at least one first airbag is inflated, and then said at least one second airbag is sequentially deployed after said at least one first airbag based exclusively on measurement of a pressure in said at least one first airbag, and wherein said at least one second airbag is contained within said at least one first airbag.

16. A vehicle protection system comprising:
an exterior airbag system for the outside of a vehicle and housed about the exterior of said vehicle, said airbag system comprising at least one first airbag, and at least one second airbag;
an inflator system for inflation of said at least one first airbag and said at least one second airbag, said inflation system comprising at least one inflator operably communicating with said at least one first airbag and said at least one second airbag; and
a sensor system for sensing impending or actual collision data, said sensor system comprising at least one sensor and at least one central computer processing unit for receipt and processing of said data, and then selective activation of said inflator system,
wherein upon activation of said inflator system, said at least one first airbag is inflated, and then said at least one second airbag is sequentially deployed after said at least one first airbag based on measurement of system operating conditions and receipt of the same by said central computer processing unit, wherein said at least one second airbag is contained within said at least one first airbag.

* * * * *